United States Patent
Shooshtari et al.

(10) Patent No.: US 9,695,311 B2
(45) Date of Patent: Jul. 4, 2017

(54) FORMALDEHYDE-FREE BINDER COMPOSITIONS AND METHODS OF MAKING THE BINDERS

(75) Inventors: Kiarash Alavi Shooshtari, Littleton, CO (US); Uranchimeg Lester, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 261 days.

(21) Appl. No.: 13/559,769

(22) Filed: Jul. 27, 2012

(65) Prior Publication Data

US 2014/0027662 A1    Jan. 30, 2014

(51) Int. Cl.
  *C09D 7/12* (2006.01)
  *B05D 3/02* (2006.01)
  *C08L 61/02* (2006.01)

(52) U.S. Cl.
  CPC .................... *C08L 61/02* (2013.01)

(58) Field of Classification Search
  CPC .......... C08L 61/32; C08L 61/02; C08L 61/20; C08L 3/02; C03C 25/1095; C03C 2305/00; C09D 105/00; D04H 13/008; D04H 1/4218; Y10T 442/60; Y10T 442/30; Y10T 442/604
  USPC ..... 106/217.6, 162.1, 501.1; 524/27, 56, 58; 427/389.8, 389.9, 394; 252/62; 442/327, 442/331
  See application file for complete search history.

(56) References Cited

U.S. PATENT DOCUMENTS

| | | |
|---|---|---|
| 1,801,053 A | 4/1931 | Meigs |
| 3,006,879 A | 10/1961 | Ryan et al. |
| 3,383,267 A | 5/1968 | Sundén |
| 3,513,001 A | 5/1970 | Worthington et al. |
| 4,048,127 A | 9/1977 | Gibbons et al. |
| 4,410,685 A | 10/1983 | Williams |

(Continued)

FOREIGN PATENT DOCUMENTS

| | | |
|---|---|---|
| DE | 1905054 A1 | 8/1969 |
| DE | 102004033561 A1 | 9/2005 |

(Continued)

OTHER PUBLICATIONS

Opposition filed Sep. 26, 2014 by Knauf Insulation to European Patent No. EP2464771 granted Dec. 25, 2013, 21 pages.

(Continued)

*Primary Examiner* — Camie Thompson
(74) *Attorney, Agent, or Firm* — Robert D. Touslee

(57) ABSTRACT

Formaldehyde-free binder compositions are described that include an aldehyde or ketone, an organic anhydride, an alkanol amine, and a nitrogen-containing salt of an inorganic acid. The binder compositions may be applied to fibers, such as glass fibers, to make formaldehyde-free, fiber-reinforced composites. Methods of making fiber-reinforced composites are also described, where such methods may include mixing an alkanol amine with an organic anhydride to make a first mixture, and adding a reducing sugar to the first mixture to make a second mixture. A nitrogen-containing salt may be added to the second mixture to make a binder composition, which may be applied to fibers to form a binder-fiber amalgam. The amalgam may be heated to cure the binder composition and form the fiber-reinforced composite.

28 Claims, 5 Drawing Sheets

(56) References Cited

U.S. PATENT DOCUMENTS

| | | |
|---|---|---|
| 5,905,115 A | 5/1999 | Luitjes et al. |
| 7,265,169 B2 | 9/2007 | Li et al. |
| 8,372,900 B2 | 2/2013 | Shooshtari et al. |
| 8,377,564 B2 | 2/2013 | Shooshtari et al. |
| 8,651,285 B2 | 2/2014 | Shooshtari et al. |
| 8,708,162 B2 | 4/2014 | Shooshtari et al. |
| 2005/0221705 A1 | 10/2005 | Hitch |
| 2006/0111480 A1* | 5/2006 | Hansen et al. .................. 524/27 |
| 2007/0027283 A1 | 2/2007 | Swift et al. |
| 2008/0160854 A1 | 7/2008 | Nandi et al. |
| 2011/0039111 A1 | 2/2011 | Shooshtari |
| 2011/0040010 A1 | 2/2011 | Shooshtari |
| 2011/0042302 A1 | 2/2011 | Shooshtari et al. |
| 2011/0042303 A1* | 2/2011 | Shooshtari ............. D04H 1/587 210/508 |
| 2011/0045966 A1 | 2/2011 | Shooshtari et al. |
| 2011/0046271 A1* | 2/2011 | Shooshtari et al. ............ 524/35 |
| 2012/0064323 A1* | 3/2012 | Shoemake ............... C08J 5/043 428/220 |
| 2013/0133548 A1 | 5/2013 | Shooshtari et al. |

FOREIGN PATENT DOCUMENTS

| | | |
|---|---|---|
| EP | 1510607 A1 | 3/2005 |
| EP | 1652868 A1 | 5/2006 |
| EP | 2223941 A1 | 9/2010 |
| EP | 2386605 A1 | 11/2011 |
| EP | 2464771 B1 | 12/2013 |
| EP | 2464772 B1 | 12/2013 |
| EP | 2467519 B1 | 12/2013 |
| GB | 2451719 A | 2/2009 |
| WO | 00/17120 | 3/2000 |
| WO | 03/022899 A1 | 3/2003 |
| WO | 2004/007615 A1 | 1/2004 |
| WO | 2007/014236 A2 | 2/2007 |
| WO | 2009/149334 A2 | 12/2009 |
| WO | 2010/106181 A1 | 9/2010 |
| WO | 2010/108999 A1 | 9/2010 |
| WO | 2010/142568 A1 | 12/2010 |
| WO | 2011/019590 A1 | 2/2011 |
| WO | 2011/019597 A1 | 2/2011 |
| WO | 2011/022227 A1 | 2/2011 |
| WO | 2013/079680 A1 | 6/2013 |

OTHER PUBLICATIONS

Opposition filed Sep. 26, 2014 by Knauf Insulation to European Patent No. EP2467519 granted Dec. 25, 2013, 10 pages.
Opposition filed Sep. 26, 2014 by Knauf Insulation to European Patent No. EP2464772 granted Dec. 25, 2013, 13 pages.

* cited by examiner

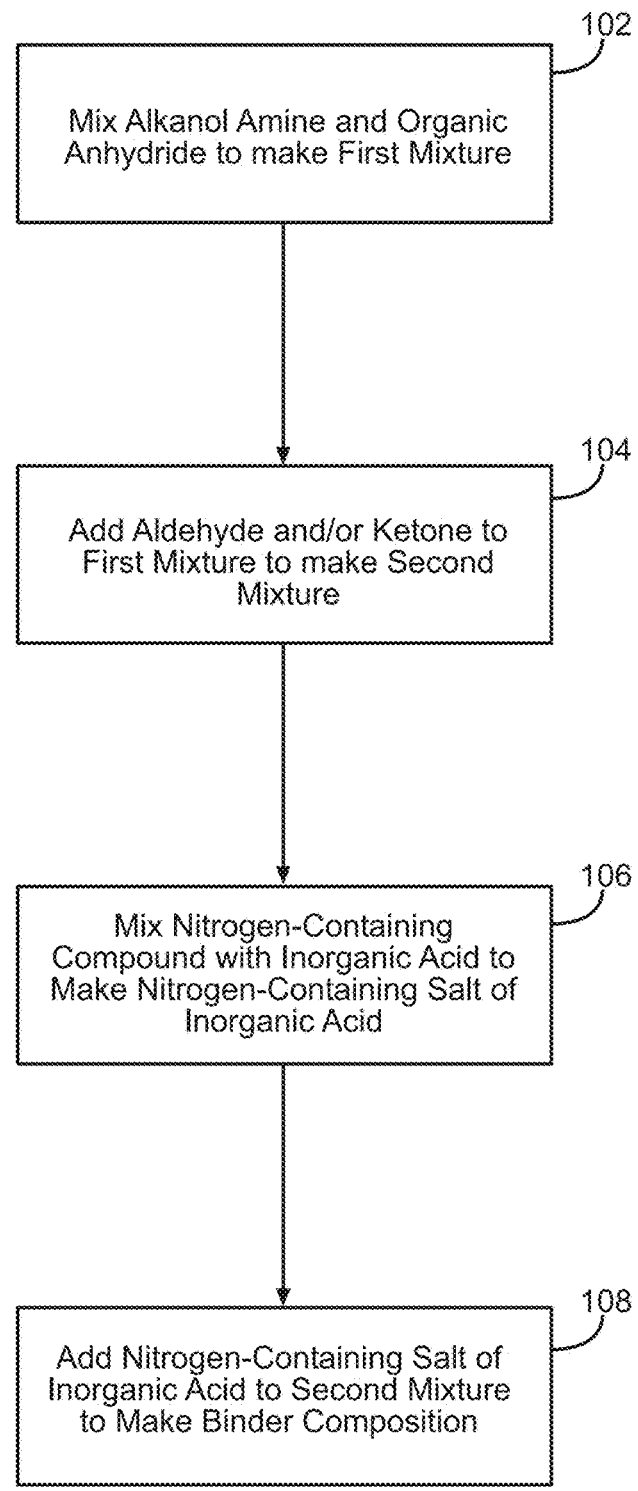

FORMALDEHYDE-FREE BINDER COMPOSITIONS AND METHODS OF MAKING THE BINDERS

BACKGROUND OF THE INVENTION

Organic polymer binders are used in a variety of composite fiber products, including fiberglass mats for roofing applications and fiberglass bat for building insulation. These organic polymer binders were often made from synthetic thermoset polymers such as phenol formaldehyde and urea formaldehyde. However, as concerns grew about the potentially carcinogenic effects of formaldehyde and the environmental sustainability of petroleum-based polymer feedstocks, new binder materials have been considered.

One alternative polymer binder replaces formaldehyde with covalently crosslinked esters formed by esterification reactions between polycarboxylic polymers and alcohols. Water is the main byproduct of these esterification reactions, and there is no formaldehyde to be off gassed by the final composite article. However, the polycarboxylic polymers and alcohols which constitute the building blocks of these binder compositions are still typically sourced from non-renewable, petroleum-based feedstocks.

Another alternative polymer binder addresses the renewable feedstock problem by substituting at least a portion of the petroleum-based feedstocks with sustainably-grown carbohydrates. However, binder systems that rely on high concentrations of carbohydrates can be prone to accelerated degradation in humid environments and require additional conditioning and additives to improve moisture and water resistance. In some instances, the carbohydrate-containing binders may also be prone to microbial degradation. Thus, there is a need to improve the stability and water resistance of carbohydrate-containing binder compositions to levels that are competitive with conventional petroleum-based binder compositions. These and other issues are addressed in the present application.

BRIEF SUMMARY OF THE INVENTION

Binder compositions are described that include a combination of an aldehyde or ketone, an organic anhydride, an alkanol amine, and a nitrogen-containing salt of an inorganic acid. The nitrogen-containing salt of an inorganic acid may include a mono or polyamine salt of a phosphorous-containing inorganic acid, such as phosphoric acid (H3PO4). The inclusion of the nitrogen-containing salt in the binder composition may have multiple benefits, including increasing the fire and flame resistance of composites made with the binder composition, and increasing the composites' tensile strength.

Embodiments of the invention include formaldehyde-free binder compositions that include an aldehyde or ketone, an organic anhydride, an alkanol amine, and a nitrogen-containing salt of an inorganic acid. Exemplary nitrogen-containing salts of inorganic acids may include mono and polyamine phosphates.

Embodiments may further include fiber-reinforced composites that include glass fibers and a cured binder formed from a formaldehyde-free binder composition. The binder composition may include an aldehyde or ketone, an organic anhydride, an alkanol amine, and a nitrogen-containing salt of an inorganic acid.

Embodiments may still further include methods of making fiber-reinforced composites. The methods may include mixing an alkanol amine with an organic anhydride to make a first mixture. A reducing sugar may be added to the first mixture to make a second mixture. A nitrogen-containing salt, formed as the reaction product of a nitrogen-containing compound and an inorganic acid, may be added to the second mixture to make the binder composition with a pH of between 2 and 4.5. The binder composition may be applied to a plurality of fibers to form a binder-fiber amalgam, and the amalgam may be heated to cure the binder composition and form the fiber-reinforced composite.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 1 is a flowchart with selected steps in a method of making a binder composition according to embodiments of the invention;

DETAILED DESCRIPTION OF THE INVENTION

Figure 2A:
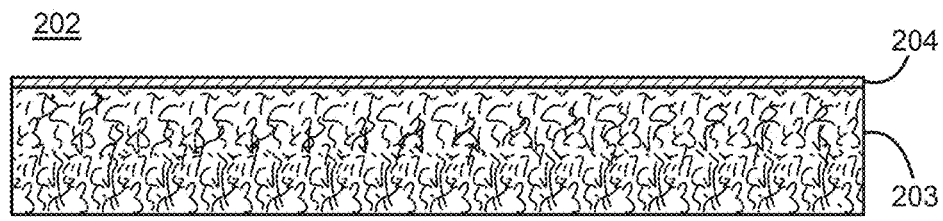
FIGS. 2A-C show simplified illustrations of exemplary composite materials according to embodiments of the invention.

The present binder compositions may include a curable composition of an aldehyde or ketone, an organic anhydride, an alkanol amine, and a nitrogen-containing salt of an inorganic acid. The compositions may be applied to fiberglass and cured to form a strong, water-insoluble binder that has good adhesion to the glass fibers. The presence of the nitrogen-containing salt of the inorganic acid may impart improved tensile strength to the glass-fiber composite as well as improved fire and flame resistance, among other enhancements.

Exemplary Formaldehyde-Free Binder Compositions

As noted above, the present binder compositions may include an aldehyde and/or ketone as one of the binder components. Exemplary aldehydes and ketones used in the binder compositions may include, without limitation, mono- and multifunctional aldehydes such as acetaldehyde, hydroxy acetaldehyde, butyraldehyde, acrolein, furfural, glyoxal, glyceraldehyde, glutaraldehyde, polyfurfural, polyacrolein, copolymers of acrolein, and others. They may also include reducing sugars, including mono-, di- and polysaccharides such as glucose (dextrose), fructose, galactose, celobrose, and maltose, among others. They may also include acetone, acetyl acetone, 1,3-dihydroxy acetone, benzel, and benzoin, among other ketones.

Exemplary organic anhydrides may include maleic anhydride, phthalic anhydride, methylphthalic anhydride, glutaric anhydride, tetrahydrophthalic anhydride, perhydrophthalic anhydride, itaconic anhydride, succinic anhydride, and trimellitic anhydride, among other anhydrides.

Exemplary alkanol amines may have the formula:

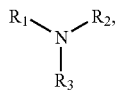

where $R_1$, $R_2$, and $R_3$ are independently chosen from, a hydrogen, a $C_{1-10}$ alkyl group, an aromatic group, and a $C_{1-10}$ hydroxy alkyl group, and wherein at least one of $R_1$, $R_2$, and $R_3$ is a hydroxyl alkyl group.

Specific examples of alkanol amines may include methanol amines such as mono-, di-, and tri-, methanol amine; ethanol amines such as monoethanol amine (MEA), diethanol amine (DEA), and triethanol amine (TEA); isopropanol amines such as mono-, di-, and tri-, isopropanol amine; methyldiethanol amine; ethyldiethanol amine; propyldiethanol amine; isopropyldiethanol amine; and n-butyldiethanol amine, among others.

Specific examples of the nitrogen-containing salt of the inorganic acid may include ammonium salts and amine-acid salts of inorganic acids. Exemplary inorganic acids may include oxygenated acids or non-oxygenated acids. Examples of suitable oxygenated acids may include phosphoric acid, pyrophosphoric acid, phosphorus acid, sulfuric acid, sulfurous acid, hypochloric acid and chlorate acid. Examples of non-oxygenated acids include may include hydrochloric acid, hydrogen sulfide and phosphine.

The salt may be prepared using any conventional technique to create salts of inorganic acids. The salts may include unsubstituted ammonium salts of an inorganic acid such as phosphoric acid (i.e., $(NH_4)H_2PO_4$, $(NH_4)_2HPO_4$, and/or $(NH_4)_3PO_4$). Reacting ammonia ($NH_3$) with the acid will yield the salt. The salts may also include substituted ammonium salts where one or more of the hydrogen atoms are replaced by an organic moiety such as alkyl group. Substituted ammonium salts are also called amine-acid salts, and may be formed by reacting an amine (e.g., ethylene diamine) with the inorganic acid in water. The molar ratio of acid functionality to amine functionality can vary, and may include exemplary ranges such as 1:25 to 25:1, 1:5 to 5:1, 1:2 to 2:1, etc.

Exemplary nitrogen-containing components of the salts may include amines such as aliphatic, cycloaliphatic and aromatic amines. The amines may be linear or branched. The amine functionalities may be di- or multifunctional primary or secondary amines. The amines can include other functionalities and linkages such as alcohols, thiols, esters, amides, ethers and others. Representative amines may include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, and mixtures of these. Exemplary diamine salts of inorganic acids may include 1,4-butanediamine and 1,6-hexanediamine salts of phosphoric acid. Examples of mono amines include, but are not limited to, methyl amine, ethyl amine, ethanol amine, diethanol amine, dimethyl amine, diethyl amine, aniline, N-methyl aniline, n-hydroxy theyl aniline, etc. Natural and synthetic amino acids such as glysine, lysine, arginine, histidine, cysteine, etc., may also be the nitrogen-containing component.

When the ammonia and/or amine is mixed in aqueous solution with the inorganic acid, the more alkaline amine is protonated by the acid to form an ammonium cation that pairs with the deprotonated acid anion to form the ammonium salt. Thus, the above described amines form their protonated ammonium ions and pair with the deprotonated acid anion to form a nitrogen-containing (e.g., unsubstituted or substituted ammonium) salt of the inorganic acid. When these ammonium salts are formed in polar-protic solutions such as aqueous solutions, the ammonium cation and deprotonated acid anion of the salt may be in dissociated form.

The binder compositions may also optionally include adhesion prompters, oxygen scavengers, solvents, emulsifiers, pigments, fillers, anti-migration aids, coalescent aids, wetting agents, biocides, curing accelerators, plasticizers, organosilanes, anti-foaming agents, colorants, waxes, suspending agents, anti-oxidants, corrosion inhibitors, cross-linking catalysts, secondary crosslinkers, and combinations of these.

Exemplary Methods of Making the Binder Compositions

FIG. 1 is a flowchart showing selected steps in a method 100 of making a binder composition according to embodiments of the invention. The method 100 includes combining an alkanol amine and an organic anhydride 102 to form a first reaction mixture that includes the alkanol amine-anhydride reaction products. Each of the reactants may be part of separate aqueous solutions that are mixed into a single reaction mixture. The reaction mixture may be heated above ambient temperature to encourage the reaction of the alkanoal amine with the organic anhydride (e.g., heated to a temperature of 40° C. to 250° C.). In some instances one or both of the separate aqueous solutions may be heated above ambient temperature before the solutions are mixed.

The aldehyde or ketone may be added to the first reaction mixture of the alkanol amine and the organic anhydride. The aldehyde or ketone may also be in solution (e.g., an aqueous solution) that is mixed into the first reaction mixture to make a second mixture 104.

Separately, the nitrogen-containing salt of an inorganic acid may be created by mixing a solution of the nitrogen-containing compound (e.g., an ammonia or amine solution) with a solution of the inorganic acid 106 (e.g., an aqueous solution of phosphoric acid). The solution may be stirred for a period of time (e.g., 5 to 10 minutes) and then added to the second mixture to make the binder composition 108.

The relative concentrations of the components in the binder composition may be adjusted to keep the pH in a range from 2 to 4.5 (e.g., a pH of 3 to 4.2). In some instances, an acid or base may be added to the binder composition to adjust and/or maintain the pH in the target range. Exemplary acids may include organic acids (e.g., maleic acid, citric acid, etc.) and inorganic acids (e.g., phosphoric acid). Exemplary bases may include hydroxide bases and ammonium-containing compounds, such as ammonium hydroxide.

Additional embodiments of the methods of making the binder compositions include variations in the order in which the binder components are added together. For example, the nitrogen-containing salt of the inorganic acid may be added to the alkanol amine, organic anhydride, or reaction mixture of the alkanol amine and organic anhydride instead of (or in additional to) adding the salt following the addition of the aldehyde or ketone.

Exemplary Fiber-Containing Composites

The binder compositions may be used to make fiber-containing composites that include woven or non-woven fibers bound together by a cured matrix of the binder. The fibers in the composite may include one or more types of fibers chosen from glass fibers, carbon fibers, mineral fibers, and organic polymer fibers, among other kinds for fibers. At the conclusion of the curing stage, the cured binder may be present as a secure coating on the fiber mat at a concentration of approximately 0.5 to 50 percent by weight of the composition, for example the cured binder may be present at concentration of approximately 1 to 10 percent by weight of the composition.

The fiber-containing composites may take a variety of forms, for example construction materials including piping insulation, duct boards (e.g., air duct boards), and building insulation, reinforcement scrim, and roofing membranes, among other construction materials. Additional examples may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials. The composites can also find use in printed circuit boards, battery separators, and filter stock, among other applications.

Figure 2B:
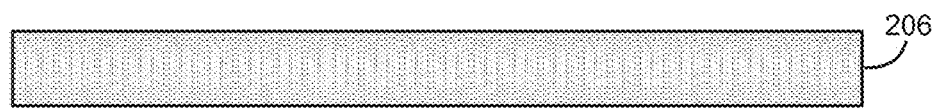
Figure 2C:
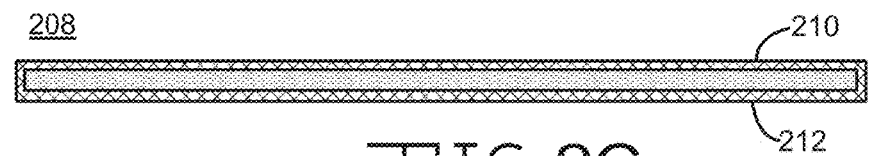

FIG. 2A-C illustrate some of these exemplary composite materials. FIG. 2A is a simplified schematic of an exemplary fiber-containing batt material 202 that may be used for building insulation. The material 202 may include a batt 203 of non-woven fibers held together by the binder. The fibers may be glass fibers used to make fiberglass insulation (e.g., low-density or high-density fiberglass insulation), or a blend of two or more types of fibers, such as a blend of glass fibers and organic polymer fibers, among other types of fibers. In some examples, a facer 204 may be attached to one or more surfaces of the batt 203.

FIG. 2B is a simplified schematic of an exemplary fiber-containing composite board 206 that may be used as an insulation board, duct board, elevated temperature board, etc. The fibers in board 206 may include glass fibers, organic polymer fibers, carbon fibers, mineral fibers, metal fibers, among other types of fibers, and blends of two or more types of fibers.

FIG. 2C is a simplified schematic of an exemplary fiber-containing flexible insulation material 208 that may be used as a wrap and/or liner for ducts, pipes, tanks, equipment, etc. The fiber-containing flexible insulation material 208 may include a facer 210 attached to one or more surfaces of the fiber material 212. Exemplary materials for the facer 210 may include fire-resistant foil-scrim-kraft facing.

Specific examples of fiber-containing composites that use the present binder compositions include low-density fiberglass insulation (e.g., less than about 0.5 lbs/ft3) and high-density fiberglass insulation.

Exemplary Methods of Making the Fiber-Containing Composites

The present binder compositions may be used in methods of binding fibers to make fiber-containing composites. The fiber-containing composites may include fibers of one or more types, such as glass fibers, carbon fibers, and organic polymer fibers, among other types of fibers. The binder compositions used to make the composites may include a reducing sugar and a reaction product of a urea compound and an aldehyde-containing compound as described above.

The methods may include the step of applying the binder composition to a mat of woven or non-woven fibers to make a curable binder-fiber amalgam. The curable amalgam is then cured to form the fiber-containing composite of fibers bound together by the cured binder.

The step of applying the binder composition to the fibers may be done by a variety of techniques including spraying, spin-curtain coating, curtain coating, and dipping-roll coating. The composition can be applied to freshly-formed fibers, or to fibers that have been cooled and processed (e.g., cut, coated, sized, etc.). The binder may be provided to the applicator as a premixed composition or may be supplied to the applicator in separate solutions for the crosslinking agent and the reducing sugar component. In some instances where the binder composition includes a solvent, a portion or all of the solvent may be removed from the composition before or after its application on the fibers.

The step of curing the binder composition may include exposing the composition applied to the fibers to an environment conducive to curing. For example, the curable amalgam of fibers and binder composition may be heated to a binder curing temperature. Exemplary binder curing temperatures may include a temperature range from 100° C. to 250° C. The curing amalgam may be heated to the curing temperature for a period of 1 minute to 100 minutes (e.g., 20 minutes).

The curing step may produce the finished fiber-containing composite, such as fiberglass insulation. In some exemplary methods, additional agents like an anti-dusting agent may be applied during or following the curing step.

Exemplary System for Making the Fiber-Containing Composites

Figure 3:
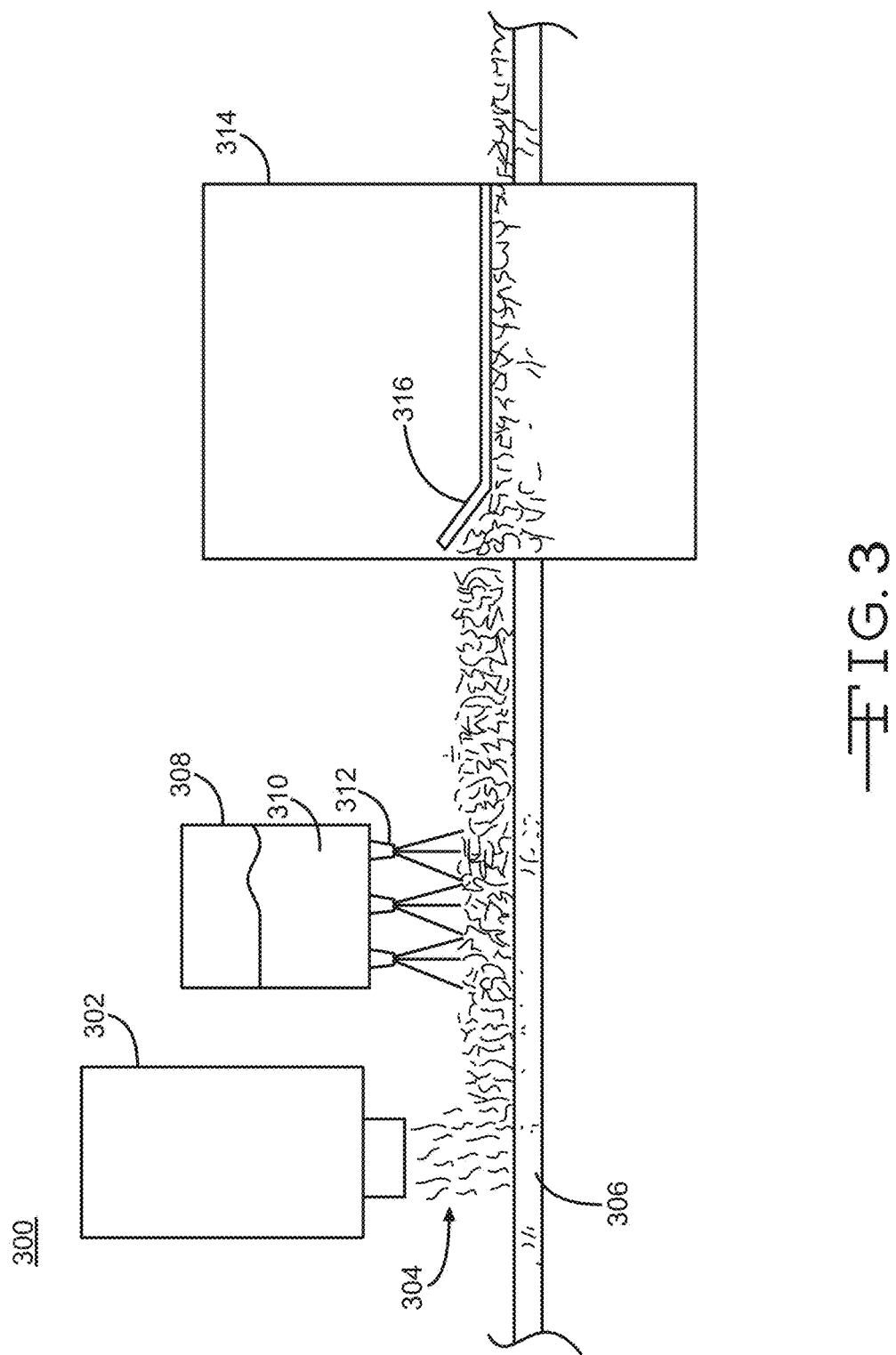
FIG. 3 depicts a simplified schematic of an exemplary fabrication system for making the fiber-containing composites according to embodiments of the invention.

FIG. 3 shows a simplified schematic of an exemplary fabrication system 300 for making the fiber-containing composites described above. The system 300 includes fiber supply unit 302 that supplies the fibers for the composite. The fiber supply unit 302 may be filled with pre-made fibers, or may include equipment for making the fibers from starting materials such as molten glass or organic polymers. The fiber supply unit 302 deposits the fibers 304 onto a porous conveyor belt 306 that transports the fibers under the binder supply unit 308.

The binder supply unit 308 contains a liquid uncured binder composition 310, that is deposited onto the fibers 304. In the embodiment shown, the binder composition 310 is spray coated onto the fibers 304 with spray nozzles 312, however, other application techniques (e.g., curtain coating, dip coating, etc.) may be used in addition to (or in lieu of) the spray coating technique illustrated by nozzles 312.

The binder composition 310 applied on fibers 304 forms a fiber and binder amalgam on the top surface of the conveyor belt 306. The belt 306 may be perforated and/or porous to allow excess binder composition 310 to pass through the belt 306 to a collection unit (not shown) below. The collection unit may include filters and circulation pumps to recycle at least a portion of the excess binder back to the binder supply unit 308.

The conveyor belt 306 transports the amalgam to an oven 314 where it is heated to a curing temperature and the binder composition starts to cure. The temperature of the oven 314 and the speed of the conveyor belt 306 can be adjusted to control the curing time and temperature of the amalgam. In some instances, process conditions may set to completely cure the amalgam into the fiber-containing composite. In additional instances, process conditions may be set to partially cure the amalgam into a B-staged composite.

The amalgam may also be compressed prior to or during the curing stage. System 300 shows an amalgam being compressed by passing under a plate 316 that tapers downward to decrease the vertical space available to the curing amalgam. The amalgam emerges from under the plate 316 in a compressed state and has less thickness than when it first made contact with the plate. The taper angle formed between the plate 316 and conveyor belt 306 can be adjusted to adjust the level of compression placed on the amalgam. The partially or fully cured composite that emerges from under plate 316 can be used for a variety of applications, including construction materials such as pipe, duct, and/or wall insulation, among other applications.

EXAMPLES

Tensile strength tests were conducted on composites made with a comparative binder composition that included the reaction products of monoethanol amine and maleic anhydride mixed with dextrose (i.e., an EMD binder composition) and a present binder composition that include the above reactants in combination with a nitrogen-containing salt of an inorganic acid in the form of ethylene diamine phosphate (i.e., an EMEPD binder composition).

Making the EMD binder composition started with dissolving about 61 g (1 mole) of monoethanolamine (MEA) in 169 g of water at room temperature in a reactor having a stirring capability. The temperature of the mixture was raised to 55° C. as the MEA formed an aqueous solution in the reactor. Approximately 98 g (1 mole) of maleic anhydride was added slowly to the aqueous MEA solution such that the solution temperature stayed below 80° C. After the maleic anhydride dissolved, a clear solution containing 50 wt. % solids was obtained. An aqueous solution of dextrose was then added to the solution, where the dextrose solution was made from 1080 g (6 moles) of anhydrous dextrose dissolved in 1080 g of water. After the addition of the aqueous dextrose solution, 62.5 g of diammonium sulfate was added to form the EMD binder composition (a solution). The composition has a pH of 3.8 to 4.0.

Making the EMEPD binder composition started with a solution similar to the above-described EMD binder composition (i.e., an EMD solution) except there was no addition of diammonium sulfate. Meanwhile, 60 g (1-mole) of ethylene diamine was dissolved in 141 g of water in a separate, second reactor. As the aqueous ethylene diamine solution was being agitated, 115.3 g (1-mole) of an 85 wt. % aqueous solution of phosphoric acid was added to generate a 50 wt. % solution of ethylene diamine phosphate salt. The phosphate salt solution was added to the EMD solution (without ammonium sulfate) and stirred to thoroughly mix the solutions and form the EMEPD binder composition (a solution). The EMEPD solution has a pH of 4.0.

Each of the EMD and EMEPD binder compositions was formulated into 25 g samples having a 50 wt. % solids level and mixed with 1000 g of glass beads to make uncured composites. Roughly 1 ounce samples of the uncured composites were then spread into dogbone molds and pressed in the molds at a pressure of about 10,000 lbs. The dogbone samples were then released from the molds and heated at about 400° F. for about 20 minutes to form cured dogbone composites. The cured dogbone composites were roughly 25 mm wide and 6 mm thick.

Figure 4:
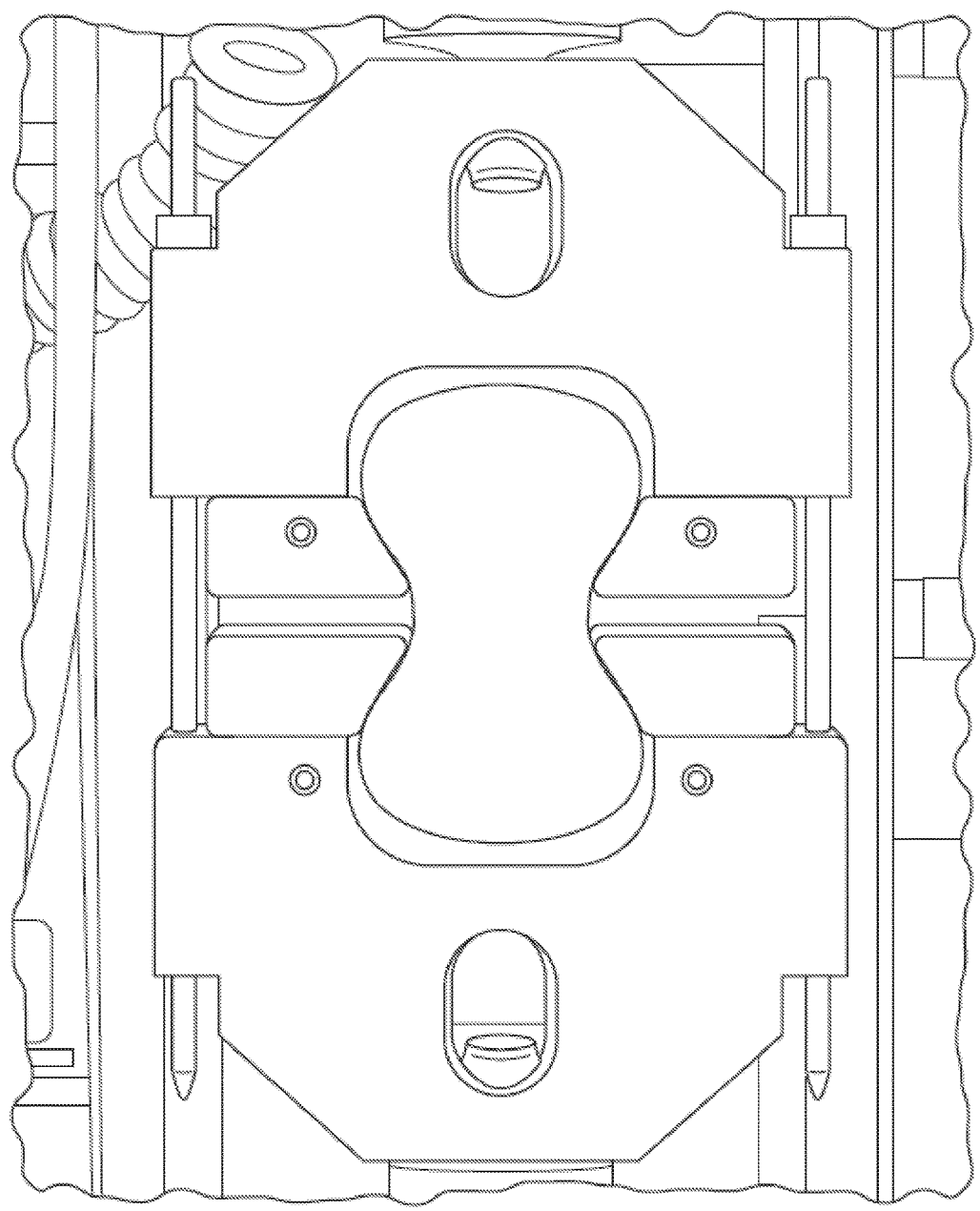
FIG. 4 is a picture of a cured dogbone composite placed in an Instron tensile strength measuring instrument.

The cured dogbone composites were tested for tensile strength in both an unaged condition and after being aged in a high humidity atmosphere. The unaged composites were taken directly from the curing oven and placed in an Instron tensile strength testing instrument (Harry W. Dietert Co.—Tensile Core Grip Assembly Part No. 610-7CA) as shown in FIG. 4. The aged composites were taken from the curing oven and placed for 24 hours in a humidifying oven set at approximately 95% humidity and 120° F. After the aged samples were cooled for approximately 8 hours, they were placed in the Instron instrument to test their tensile strength.

Figure 5:
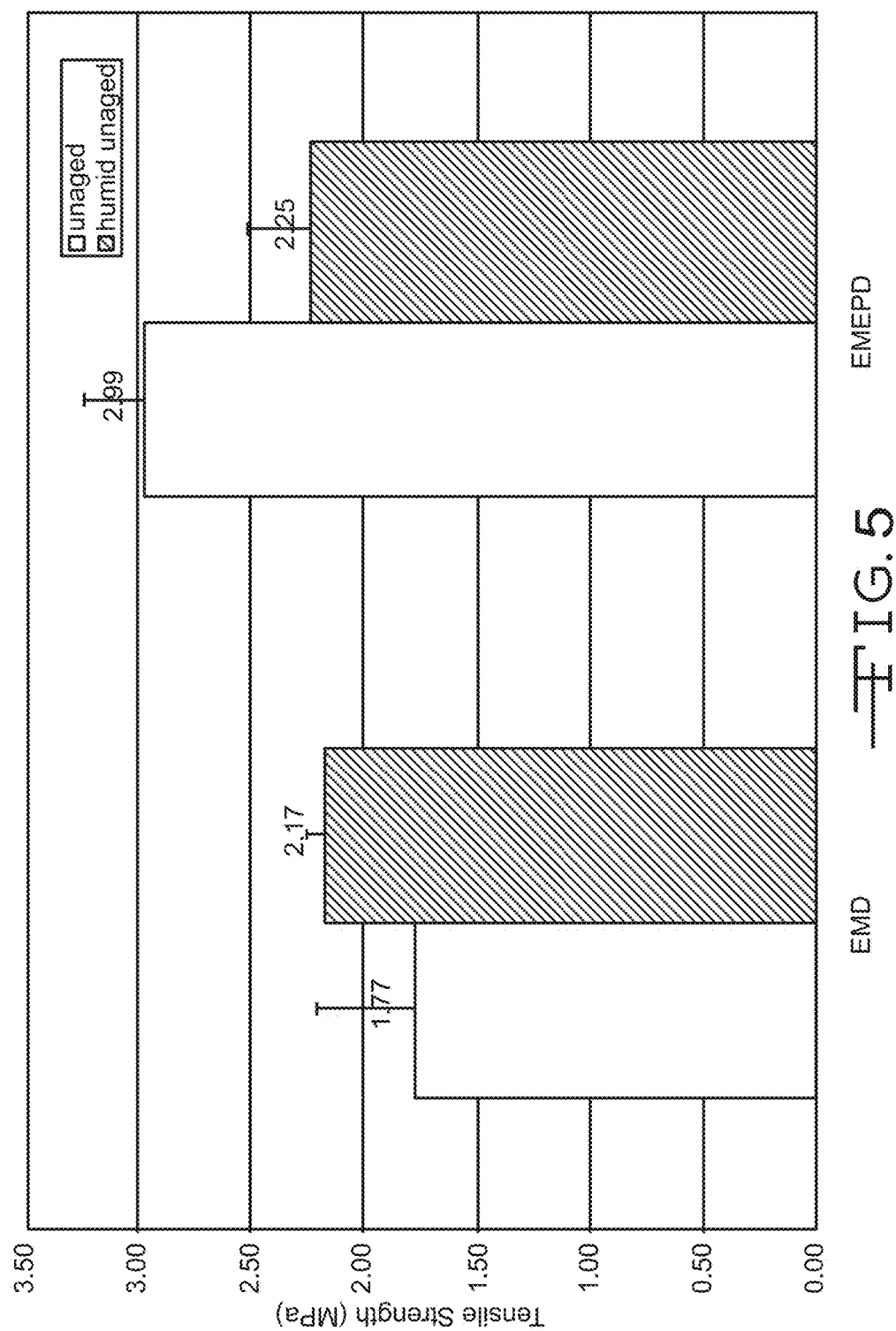
FIG. 5 is a graph with dogbone tensile strength test results for binder composites.

FIG. 5 is a graph showing the dogbone tensile strength test results for the present EMEPD binder under unaged and humid-aged conditions, as well the strength test results for the comparative composite made from the EMD binder composition. The results demonstrate that the unaged EMEPD binder composite has significantly increased tensile strength (2.99 MPa) compared to the EMD composite (1.77 MPa). The composites that were first humid aged before being tested showed a narrowed difference in the tensile strength between the composites, but still had the EMEPD composite with a higher tensile strength (2.25 MPa) than the EMD composite (2.17 MPa).

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the reducing sugar" includes reference to one or more reducing sugars and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A formaldehyde-free binder composition comprising:
an aldehyde or ketone;
a reaction product of a monomeric organic anhydride and an alkanol amine; and
a nitrogen-containing salt of an inorganic acid, wherein:
the reaction product reacts with the nitrogen-containing salt of the inorganic acid when the binder composition is cured, and
the composition has a pH of between 2 and 4.5.

2. The formaldehyde-free binder composition of claim 1, wherein the aldehyde or ketone is a reducing sugar.

3. The formaldehyde-free binder composition of claim 2, wherein the reducing sugar is dextrose.

4. The formaldehyde-free binder composition of claim 1, wherein the monomeric organic anhydride is chosen from maleic anhydride, phthalic anhydride, tetrahydrophthalic anhydride, perhydrophthalic anhydride, itaconic anhydride, and succinic anhydride.

5. The formaldehyde-free binder composition of claim 1, wherein the monomeric organic anhydride is maleic anhydride.

6. The formaldehyde-free binder composition of claim 1, wherein the alkanol amine has the structure:

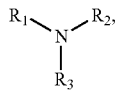

wherein $R_1$, $R_2$, and $R_3$ are independently chosen from, a hydrogen, a $C_{1-10}$ alkyl group, an aromatic group, and a $C_{1-10}$ hydroxy alkyl group, and wherein at least one of $R_1$, $R_2$, and $R_3$ is a hydroxyl alkyl group.

7. The formaldehyde-free binder composition of claim 1, wherein the alkanol amine is chosen from monoethanol amine, diethanol amine, and triethanol amine.

8. The formaldehyde-free binder composition of claim 1, wherein the nitrogen-containing salt is an unsubstituted ammonium salt.

9. The formaldehyde-free binder composition of claim 1, wherein the nitrogen-containing salt is a substituted ammonium salt, and the substituted ammonium salt is an ammonium salt that has a hydrogen atom replaced by an organic moiety.

10. The formaldehyde-free binder composition of claim 1, wherein the nitrogen-containing salt is a substituted ammonium salt having a polyammonium ion, and the substituted ammonium salt is an ammonium salt that has a hydrogen atom replaced by an organic moiety.

11. The formaldehyde-free binder composition of claim 10, wherein the polyammonium ion is chosen from ethylene diammonium ion, 1,3-propanediammonium ion, 1,4-butanediammonium ion, 1,5-pendanediammonium ion, 1,6-hexanediammonium ion, α,α'-diaminoxylene ion, diethylenetriammonium ion, triethylenetetraammonium ion, tetraethylenepentammonium ion, and diamino benzene ion.

12. The formaldehyde-free binder composition of claim 1, wherein inorganic acid is phosphoric acid.

13. The formaldehyde-free binder composition of claim 1, wherein the nitrogen-containing salt of an inorganic acid is chosen from ethylene diammonium phosphate and hexamethylene diammonium phosphate.

14. The formaldehyde-free binder composition of claim 1, wherein the binder composition comprises one or more additional compounds chosen from adhesion promoters, oxygen scavengers, moisture repellants, solvents, emulsifiers, pigments, fillers, anti-migration aids, coalescent aids, wetting agents, biocides, plasticizers, organosilanes, anti-foaming agents, colorants, waxes, suspending agents, antioxidants, and crosslinking catalysts.

15. The formaldehyde-free binder composition of claim 1, wherein a molar ratio of the alkanol amine to the aldehyde or ketone is about 1:6.

16. The formaldehyde-free binder composition of claim 1, wherein the composition has a pH of between 3 and 4.2.

17. The formaldehyde-free binder composition of claim 1, wherein the binder composition comprises an organic acid.

18. The formaldehyde-free binder composition of claim 17, wherein the organic acid comprises citric acid.

19. The formaldehyde-free binder composition of claim 1, wherein the aldehyde or ketone comprises a multifunctional aldehyde.

20. The formaldehyde-free binder composition of claim 19, wherein the multifunctional aldehyde comprises glyoxal.

21. The formaldehyde-free binder composition of claim 1, wherein the binder composition further comprises a urea compound.

22. The formaldehyde-free binder composition of claim 1, wherein the binder composition comprises a reaction product of a urea compound and the aldehyde or ketone.

23. The formaldehyde-free binder composition of claim 22, wherein the aldehyde or ketone comprises glyoxal.

24. The formaldehyde-free binder composition of claim 1, wherein the aldehyde or ketone comprises fructose.

25. The formaldehyde-free binder composition of claim 1, wherein the binder composition is an aqueous solution.

26. A binder composition comprising:
   a reducing sugar;
   a reaction product of maleic anhydride and an ethanol amine; and
   a nitrogen-containing salt of phosphoric acid, wherein:
   the reaction product reacts with the nitrogen-containing salt of phosphoric acid when the binder composition is cured, and
   the binder composition has a pH of between 2 and 4.5.

27. A binder composition comprising:
   an aldehyde or ketone;
   a reaction product of a monomeric organic anhydride and an alkanol amine;
   a nitrogen-containing salt of an inorganic acid, and
   a urea compound, wherein:
   the reaction product reacts with the nitrogen-containing salt of the inorganic acid when the binder composition is cured,
   the urea compound forms an additional reaction product with the aldehyde or ketone; and
   the binder composition has a pH of between 2 and 4.5.

28. The binder composition of claim 27, wherein the aldehyde or ketone comprises glyoxal.

* * * * *